United States Patent
Roux

(10) Patent No.: US 6,735,521 B1
(45) Date of Patent: May 11, 2004

(54) ONBOARD SYSTEM IN A VEHICLE AND CENTRAL SYSTEM FOR LOCATING THE VEHICLE ACCURATELY

(75) Inventor: Raphaël Roux, deceased, late of Argenteuil (FR), by, legal representative Josette Roux

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/537,559

(22) Filed: Mar. 30, 2000

(30) Foreign Application Priority Data

Mar. 31, 1999 (FR) ................................................ 9904060

(51) Int. Cl.[7] ............................. G01S 3/02; G01S 5/02
(52) U.S. Cl. ......................... 701/213; 701/207; 340/945
(58) Field of Search ............................... 701/207, 213, 701/214, 221, 14, 215, 300, 120, 208; 340/945, 990; 342/357.07, 457, 36, 450

(56) References Cited

U.S. PATENT DOCUMENTS

| | | | | |
|---|---|---|---|---|
| 3,047,861 A | * | 7/1962 | Arnold et al. ............... 343/112 |
| 4,359,733 A | * | 11/1982 | O'Neill .................. 343/6.5 LC |
| 4,897,661 A | * | 1/1990 | Hiraiwa ...................... 343/457 |
| 5,111,400 A | * | 5/1992 | Yoder .................... 364/424.01 |
| 5,200,902 A | * | 4/1993 | Pilley ......................... 364/439 |
| 5,347,285 A | * | 9/1994 | MacDoran et al. ......... 342/357 |
| 5,430,654 A | * | 7/1995 | Kyrtsos et al. ............. 364/449 |
| 5,475,393 A | * | 12/1995 | Heinzerling ................ 342/410 |
| 5,541,845 A | * | 7/1996 | Klein .......................... 364/449 |
| 5,574,648 A | * | 11/1996 | Pilley .......................... 364/439 |
| 5,619,211 A | * | 4/1997 | Horkin et al. ............... 342/357 |
| 5,714,948 A | | 2/1998 | Farmak et al. ............... 340/961 |
| 5,752,218 A | * | 5/1998 | Harrison et al. ............ 701/207 |
| 5,793,813 A | * | 8/1998 | Cleave ........................ 375/259 |
| 5,797,091 A | | 8/1998 | Clise et al. .................. 455/404 |
| 5,948,043 A | * | 9/1999 | Mathis ........................ 701/208 |
| 5,959,577 A | * | 9/1999 | Fan et al. ............... 342/357.13 |
| 5,974,349 A | * | 10/1999 | Levine ......................... 701/29 |
| 5,977,909 A | * | 11/1999 | Harrison et al. ........ 342/357.09 |
| 6,029,111 A | * | 2/2000 | Croyle ........................ 701/207 |
| 6,157,891 A | * | 12/2000 | Lin .............................. 701/301 |
| 6,243,647 B1 | * | 6/2001 | Berstis et al. ............... 701/213 |

* cited by examiner

Primary Examiner—Tan Q. Nguyen
Assistant Examiner—Dalena Tran
(74) Attorney, Agent, or Firm—Sughrue Mion, PLLC

(57) ABSTRACT

An onboard system determines the position of a vehicle from radio signals from a constellation of navigation satellites and periodically transmits to a traffic control center the position thus determined, a time label supplied by the constellation of navigation satellites and the identity of the vehicle. A central system for accurately locating at least one vehicle provided with a system of the above kind calculates the position at the current time as a function of the position and the speed vector of the vehicle and the time label transmitted by the vehicle. These systems can determine a position periodically and with great accuracy because the time label supplied by the constellation of navigation satellites can be used to compensate fluctuations in the transmission time between the vehicle and the traffic control center when the position is received in the traffic control center.

8 Claims, 3 Drawing Sheets

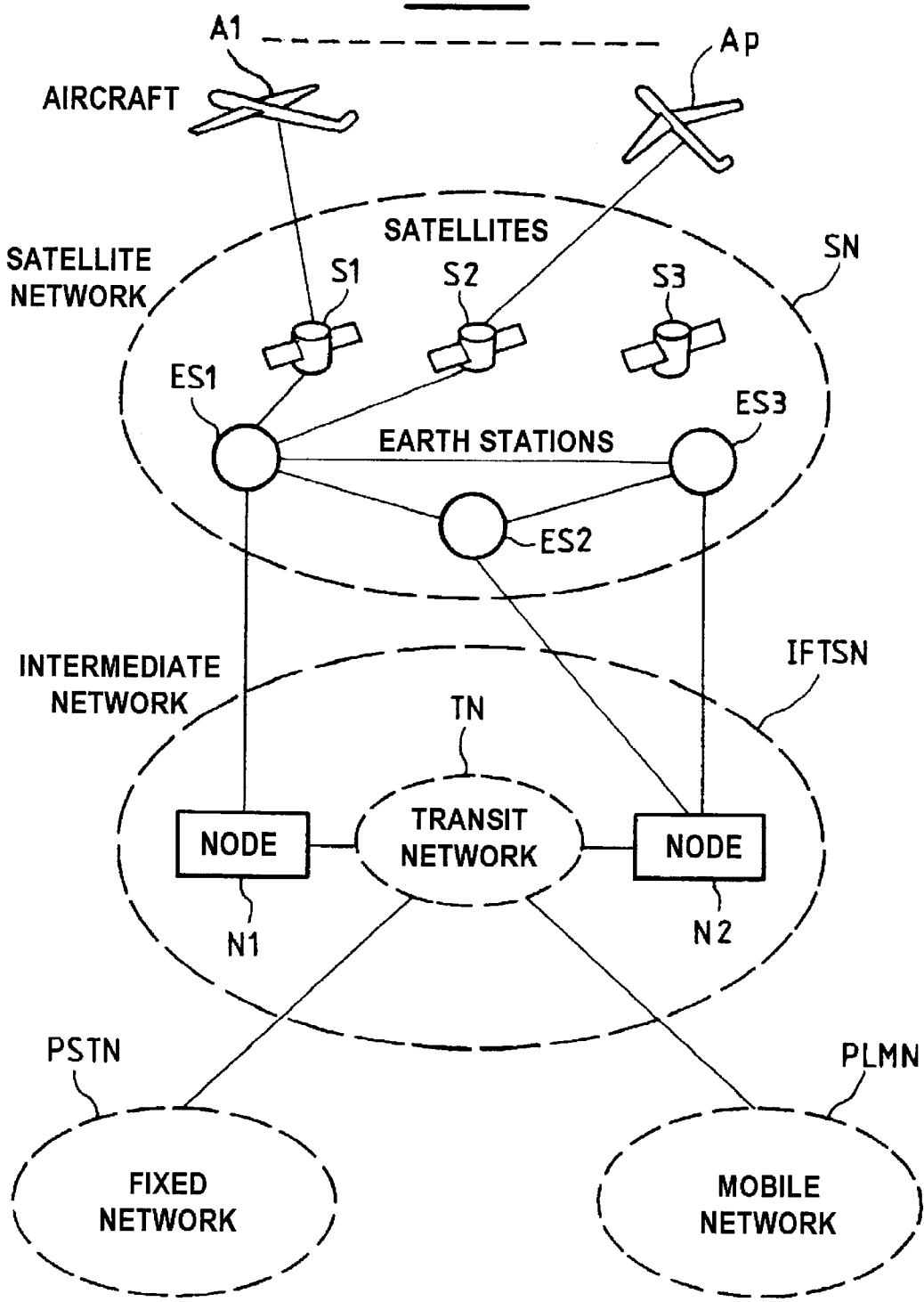

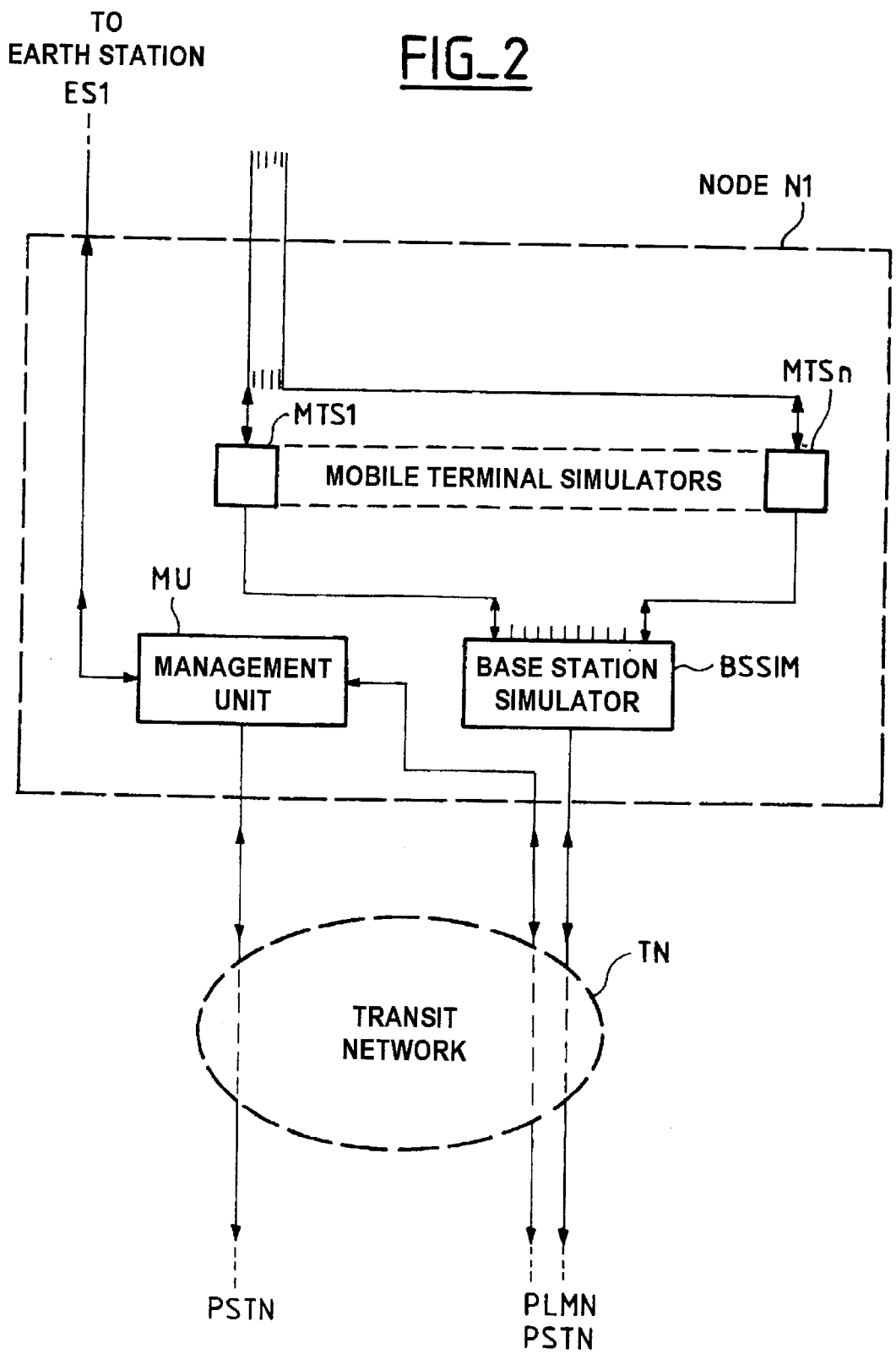

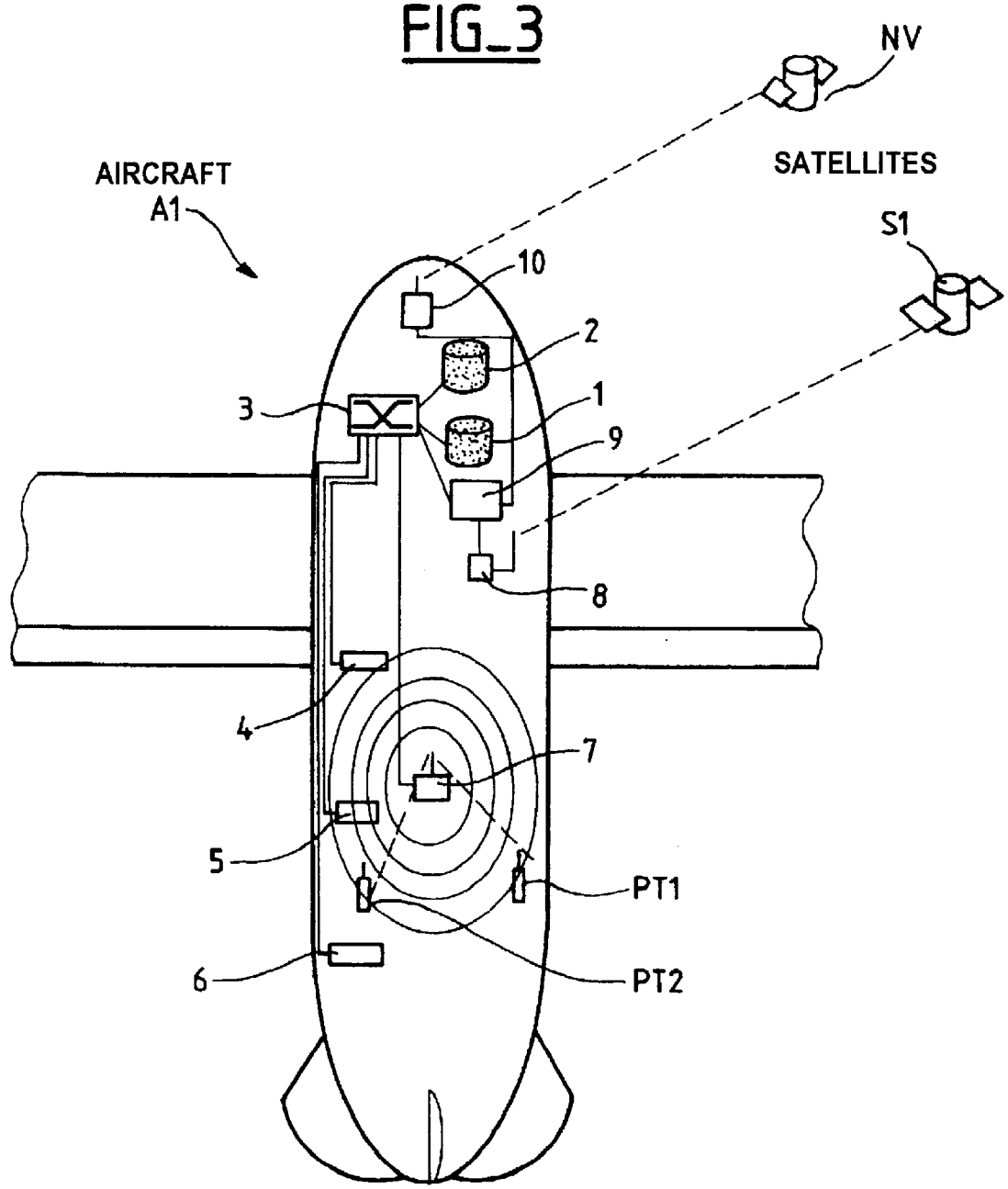

ONBOARD SYSTEM IN A VEHICLE AND CENTRAL SYSTEM FOR LOCATING THE VEHICLE ACCURATELY

BACKGROUND OF THE INVENTION

1. Field of the Invention

The object of the invention is to propose a system for accurately locating the position of a vehicle, in particular an aircraft. Air traffic control requires the position of each aircraft to be known. It is known in the art to use radar and transponders on board aircraft, each transponder responding to a radar pulse by transmitting the identity of the aircraft. A first drawback of radar is that not all of the surface of the earth is covered. A second drawback of radar is its relative inaccuracy. With air traffic constantly increasing, it is necessary to improve the accuracy with which the position of aircraft is determined in order to be able to reduce the spacing between aircraft. The maximum accuracy of radar is limited by various phenomena and decreases with distance, which makes it necessary to consider using other systems to determine the position of each aircraft with greater accuracy.

2. Description of the Prior Art

It is known in the art to use a GPS (Global Positioning System) receiver on board aircraft to determine the position of the aircraft with very great accuracy by a method known in the art based on the reception of a plurality of signals transmitted by satellites NV of the Navstar constellation. It is known in the art to transmit the position of the aircraft automatically by radio to a ground station and then to an air traffic control center via a terrestrial transmission network dedicated to this service. However, this system has two drawbacks:

a dedicated network is very costly; and
the accuracy of the position transmitted is degraded by the fact that the transmission time between the aircraft and the control center is not perfectly constant: fluctuations in the transmission time correspond to position differences which are proportional to speed and which are therefore not negligible if an aircraft is travelling at 1000 kph, for example.

SUMMARY OF THE INVENTION

The invention provides an onboard system in a vehicle for locating the vehicle accurately, the system including:

means for determining the position of the vehicle from radio signals from a constellation of navigation satellites, and means for periodically transmitting to a control center the position thus determined, a time label supplied by the constellation of navigation satellites and the identity of the vehicle.

The invention also provides a central system for accurately locating at least one vehicle provided with an onboard system of the above kind, the central system including means for calculating the position at the current time as a function of the position and the speed vector of the vehicle and the time label transmitted by the vehicle.

The above systems determine a position periodically with great accuracy because the time label supplied by the navigation satellite constellation enables fluctuations in the transmission time between the vehicle and the air traffic control center to be compensated when the position is received in the air traffic control center.

The invention will be better understood and other features will become apparent from the following description and the accompanying drawings.

BRIEF DESCRIPTION OF THE DRAWINGS

FIG. 1 is a diagram illustrating the use of a system for communicating with aircraft and including nodes and onboard stations according to the invention.

FIG. 2 is a diagram showing one embodiment of a node according to the invention.

FIG. 3 is a diagram showing one embodiment of an onboard station according to the invention, installed on board an aircraft.

DETAILED DESCRIPTION OF THE PREFERRED EMBODIMENT

FIG. 1 is a diagram which illustrates the use of a system for communicating with passengers on aircraft, the system including nodes and local area networks according to the invention. To benefit from onboard telecommunication and entertainment services, a passenger must be accessible by means of a directory number. A number of methods for rendering the passenger accessible are described below. It is not essential for a passenger already to be a subscriber to a terrestrial mobile telephone or fixed telephone network.

The system essentially includes: an onboard station (not shown in FIG. 1) in each aircraft A1 to Ap, a telecommunication satellite network SN, of a type known in the art, having worldwide coverage, such as the Irridium network, and an intermediate network IFTSN which is interfaced to the satellite network SN, to a fixed telecommunication network PSTN and to a terrestrial mobile telephone network PLMN, for example of the GSM type.

The satellite network SN includes a constellation of satellites S1, S2, S3, etc, in moderately high orbit and earth stations ES1, ES2, ES3, etc. The onboard station of each aircraft A1 to Ap is in communication with a satellite at all times. Passengers make and receive calls via the satellite network SN. The satellite network sees each passenger involved in a call as a temporary dummy subscriber of the network SN. Thus the network SN manages roaming of passengers on the aircraft A1 to Ap able to telephone via the satellite network in the some manner at it manages roaming of any user employing an Irridium portable terminal anywhere on the surface of the Earth. The intermediate network IFTSN, the fixed network PSTN and the terrestrial mobile telephone network PLMN therefore do not have to manage roaming of the aircraft.

The intermediate network IFTSN includes a plurality of nodes N1, N2, etc, and a transit network TN connecting all the nodes to each other, to the fixed network PSTN and to the terrestrial mobile telephone network PLMN. The earth stations ES1, ES2, ES3 are connected to each other, the station ES1 is connected to the node N1 and the stations ES2 and ES3 are connected to the node N2. Each node N1, N2, etc is a gateway between the satellite network SN and the terrestrial networks PSTN and PLMN.

The network PLMN sees each node N1, N2, etc as a dummy base station and each passenger involved in a call as a dummy mobile subscriber of the network PLMN in the service area of one of the dummy base stations. The network PSTN sees each passenger involved in a call as a subscriber of another fixed network managed by another operator. The intermediate network IFTSN sees the network SN as a standard terrestrial mobile telephone network able to manage roaming of its subscribers itself.

Each aircraft has a group of subscriptions to the satellite network SN. The number of subscriptions fixes the number of passengers who can telephone simultaneously. Each passenger involved in a call is considered as a temporary dummy subscriber of the network SN, since it is the carrier who is the real and permanent subscriber to the satellite network SN.

In other embodiments of the invention, the intermediate network IFTSN can comprise only one node.

FIG. 2 is a diagram showing one embodiment of the node N1 in accordance with the invention. It includes:

- at least one base station simulator BSSIM connected via the transit network TN to the terrestrial mobile telephone network PLMN to simulate the behavior of a base station of the terrestrial mobile telephone network,
- n mobile terminal simulators MTS1 to MTSn connected to the base station simulator BSSIM and to the earth station ES1 to simulate the behavior of n dummy mobile terminals of the network PLMN remaining at all times within the area of the dummy base station, the n simulators respectively corresponding to n passengers involved in a call, and
- a management unit MU for managing the node N1, connected to the earth station ES1 of the satellite network SN and interfaced to the networks PSTN and PLMN via the transit network TN.

The main function of the management unit MU is to associate n subscriber numbers of the satellite network SN with n passengers. Each passenger is designated by their real directory number, either that of a terrestrial mobile telephone network or that of a fixed telephone network. If a passenger is a subscriber to a terrestrial mobile telephone network, and if their subscription entitles them to the in-flight telephone service via the terrestrial mobile telephone network PLMN, the directory number of the passenger is further associated with one of the mobile terminal simulators MTS1 to MTSn.

Each mobile terminal simulator MTS1 to MTSn includes a processor and:

- software for recording in the subscriber databases of the terrestrial mobile telephone network PLMN, at an address corresponding to the directory number of a passenger, the presence of a dummy mobile terminal in the coverage area of the dummy base station corresponding to the base station simulator BSSIM, in order to route all calls addressed to the passenger to that simulator,
- software for receiving a call set-up request from a passenger, submitting a call set-up request to the terrestrial mobile telephone network PLMN as if it originated from a mobile terminal of the terrestrial mobile telephone network PLMN, and then setting up a call with the aircraft carrying that passenger, via the satellite network SN, when the call has been set up in the terrestrial mobile telephone network PLMN, and
- software for requesting the satellite network SN to set up a call to a passenger, designated by their subscriber number in the satellite network SN, if the simulator receives a call from the network PLMN containing the directory number of the passenger.

The base station simulator BSSIM includes a processor and:

- software for routing to a mobile terminal simulator MTSi all calls containing the directory number designating the passenger corresponding to that simulator, and
- software for routing to the network PLMN or the network PSTN all calls from the simulators MTS1 to MTSn addressed to one of those networks.

FIG. 3 is a diagram showing one embodiment of the onboard station according to the invention, the station being installed on board an aircraft A1, for example. The onboard station includes:

- in-flight entertainment servers 1, 2 providing video on demand or general video,
- an Ethernet data frame switch 3,
- Ethernet data frame concentrators 4, 5, 6, etc connected to the switch 3 and to voice-data terminals integrated into the passenger seats, not shown,
- a "mini" GSM base station 7 radiating only into the cabin of the aircraft to enable passengers to use their usual GSM mobile telephones outside flight phases during which the use of mobile telephones is prohibited,
- a radio transceiver 8 for setting up a radio link to a satellite S1 of the satellite network SN, and
- a processor 9 connected to the transceiver 8 and serving as a gateway to the satellite network SN, which sees it as a group of dummy mobile subscribers of the network SN, each declared passenger retaining during the flight a subscriber number of the network SN associated with their usual directory number.

The voice-data terminals are preferably compatible with the Internet protocol and include a screen, an alphanumeric keyboard and a telephone handset or headset. They provide multiple services: telephone, Internet access, video on demand or general video, audio, cabin service.

On the assumption that the use of mobile telephones on board aircraft is allowed, possibly except during take-off and landing, the "mini" base station 7 is used to set up a link with GSM portable terminals. Thus passengers preferring to use their personal GSM mobile telephone terminal can use it, in particular to telephone. The "mini" base station 7 has a standard structure, enabling standard GSM mobile telephones to be used in the cabin of the aircraft. However, it also includes a system for detecting the presence of a GSM or other type mobile telephone in use in the cabin. This detector system can be activated by the cabin crew during take-off and landing, to signal such presence automatically (for example by means of an audible alarm device or by a prerecorded announcement). The system therefore enables effective enforcement of the prohibition on use of mobile telephone terminals during take-off and landing.

To be contactable, a passenger must register their presence via the processor 9 on board the aircraft and via the management unit of the node N1 which manages telecommunications with the aircraft. A number of methods can be used for this:

Passengers who have their personal GSM mobile telephone terminal with them can initiate registration of their presence on board by switching on their personal GSM mobile telephone terminal (not during take-off or landing). The "mini" base station 7 signals their presence to the processor 9 which then stores the directory number of the passenger in the local list, after which it transmits it to the management unit MU of a node of the intermediate network, for example node N1, for the latter to associate the directory number with a mobile terminal simulator.

Passengers who do not have their mobile telephone, or who do not wish to use it, or who are not authorized to use it, can initiate registration of their presence on board by switching on the voice-data terminal in front of them, choosing an option from a menu and entering their directory number, whether they are subscribers to a fixed network or to a terrestrial mobile telephone network, and provided that their subscription entitles them to use this on board aircraft telecommunication service. A reader for SIM cards (personal microchip cards normally inserted into a mobile telephone) can optionally be incorporated into each voice-data terminal to acquire the directory number automatically and to enable use of the personal directory stored on the card.

A passenger having no subscription to a terrestrial network, or not wishing to use it, can request a temporary subscription for the duration of the flight. The carrier either processes such subscriptions in its own billing center or sells passengers prepaid cards like the standard cards used in public telephones. The voice-data terminals must then include an appropriate card reader.

The directory number of each passenger can optionally be registered when their boarding card is checked. The checking is done by a machine. All that is required is for the machine to include a keypad enabling each passenger to enter their directory number. The machine simultaneously reads the seat number on the boarding card, which tells it which voice-data terminal the passenger could use.

In all cases, the processor 9 records the presence of these passengers in a list, designating each passenger by their directory number in the fixed network or the terrestrial mobile telephone network. It associates the directory number with:

an available number from the dummy subscriber numbers of the satellite network SN allocated to the aircraft concerned, a seat number (which designates the voice-data terminal the passenger can use), and an account of amounts due for entertainment services.

It charges all entertainment and telecommunication services used by the passenger to their telephone account via signaling links of the network SN and the intermediate network IFTSN. It uses the signaling transmission means of the satellite network SN, the intermediate network IFTSN and the terrestrial mobile telephone network PLMN to communicate the directory number and the charge to a service point managing telephone billing of the passenger concerned, so that entertainment services are billed at the same time as telephone services.

If the carrier offers temporary subscriptions without prepaid cards, the billing data is transmitted to a billing center of the carrier itself.

The management unit MU and the processor 9 communicate with each other to record the same call management data. At the end of the flight, the processor 9 automatically erases the records showing the presence of the passengers from its own memories and from the management unit MU of the node N1. The passengers can then receive new calls directly on their personal terminals from standard terrestrial mobile telephone networks.

This telecommunication system enabling a permanent link to be set up between the ground and an aircraft anywhere on the Earth can be used to constitute a system enabling air traffic controllers to locate an aircraft accurately anywhere on the Earth. As shown in FIG. 3, an aircraft A1 is provided with a GPS (Global Positioning System) receiver 10 able to determine the position of the aircraft very accurately by a method known in the art and based on receiving a plurality of signals transmitted by Navstar constellation satellites NV. The onboard network transmits the GPS position and time determined by the receiver 10.

The processor 9 is connected to the onboard network and includes software for sampling on the onboard network the GPS position and time with a very short period (for example every 500 milliseconds). The position is transmitted immediately to a traffic control center, with a time ticket, the speed vector of the aircraft and the identity of the aircraft, via the satellite network SN, the intermediate network IFTSN, and the fixed network PSTN. The GPS position is also used on board the aircraft for navigation.

To determine the position of the aircraft at the current time, the control center must correct the measured position by calculating the movement of the aircraft during the transmission, based on an estimate of its duration and the transmitted speed vector. Calculation errors in this correction of the measured position due to fluctuations in the transmission time are not negligible when those fluctuations are multiplied by a speed of 1000 kph, for example.

According to the invention, this source of inaccuracy is neutralized by transmitting the time ticket. The air traffic control center has a computer which determines the position at the current time by correcting the measured position as a function of the speed vector of the aircraft, the estimated transmission time and fluctuations therein, as noted. The center receives time tickets supplied directly by the GPS satellites. Time tickets received directly and retransmitted by the aircraft are compared to determine the transmission time and fluctuations therein.

It is therefore possible to track the aircraft and to predict its future flight path with great accuracy.

This system for determining a position can be applied to other types of vehicle able to move anywhere on the Earth, and can use a different transmission system provided that it covers all of the area in which the vehicle moves. It is not costly to install on board an aircraft, which already includes a GPS receiver and an onboard station according to the invention, since all that is required is to add the necessary software. The infrastructure on the ground is also not costly, although it offers worldwide coverage, because a non-dedicated transmission network can be used, transmission time fluctuations having no significant effect on accuracy.

What is claimed is:

1. An onboard system in a vehicle responsive to positioning signals and a time label signal received from a first satellite network for locating said vehicle accurately while said vehicle is moving, said system comprising:

a position determining system for continuously determining a current position of said vehicle from said positioning signals, and for providing a current vehicle position signal;

a processor for continuously sampling the current vehicle position and said time label at short time intervals and for calculating a speed vector;

a transmitter for periodically transmitting to a control center said current position and time label, said speed vector, and identity of said vehicle, wherein said control center can accurately determine an effective new location of at least one moving vehicle provided with said onboard system as a function of said current position, speed vector, time label and identity transmitted by said transmitter.

2. A central system for accurately locating at least one moving vehicle provided with a system as claimed in claim 1, said central system including means for calculating the effective new location at a specific time as a function of the current position, speed vector and time label transmitted by said vehicle.

3. The onboard system of claim 1, wherein said transmitter transmits said current position to said control center via a second satellite network.

4. The onboard system of claim 1, wherein the first satellite network is a constellation of navigational satellites with worldwide coverage.

5. The onboard system of claim 1, wherein the control center is an air traffic control center and the vehicle is an aircraft.

6. The onboard system of claim 1, wherein said second satellite network is an intermediate network that communicates with said first satellite network, a fixed telecommunication network and a terrestrial mobile telephone network.

7. The onboard system of claim 1, wherein the sampling time interval of said processor is 500 milliseconds.

8. The control center of claim 1, further comprising:
a computer, and
a receiver responsive to time labels supplied directly by the navigational satellite network, wherein the time labels received from the vehicle transmitter and the navigational satellite are compared to determine fluctuations in a transmission time.

\* \* \* \* \*